(12) United States Patent
Martick

(10) Patent No.: US 11,112,970 B2
(45) Date of Patent: Sep. 7, 2021

(54) SOFTWARE SYSTEM LOGGING BASED ON RUNTIME ANALYSIS

(71) Applicant: SAP SE, Walldorf (DE)

(72) Inventor: Christian Martick, Berlin (DE)

(73) Assignee: SAP SE, Walldorf (DE)

( * ) Notice: Subject to any disclaimer, the term of this patent is extended or adjusted under 35 U.S.C. 154(b) by 11 days.

(21) Appl. No.: 15/620,709

(22) Filed: Jun. 12, 2017

(65) Prior Publication Data

US 2018/0356990 A1  Dec. 13, 2018

(51) Int. Cl.
*G06F 3/06* (2006.01)

(52) U.S. Cl.
CPC .......... *G06F 3/0608* (2013.01); *G06F 3/0605* (2013.01); *G06F 3/0647* (2013.01); *G06F 3/0683* (2013.01)

(58) Field of Classification Search
None
See application file for complete search history.

(56) References Cited

U.S. PATENT DOCUMENTS

| | | | | |
|---|---|---|---|---|
| 7,523,433 | B1* | 4/2009 | Anderson | G06F 11/323 716/139 |
| 7,934,202 | B2* | 4/2011 | Messmer | G06F 11/3664 710/52 |
| 8,910,124 | B1* | 12/2014 | Bhansali | G06F 11/3612 717/128 |
| 2002/0108017 | A1* | 8/2002 | Kenchammana-Hoskote | G06F 12/0804 711/113 |
| 2007/0185938 | A1* | 8/2007 | Prahlad | G06F 16/2365 |
| 2008/0082650 | A1* | 4/2008 | Takata | H04L 63/0428 709/223 |
| 2009/0292744 | A1* | 11/2009 | Matsumura | G06F 16/27 |
| 2010/0169551 | A1* | 7/2010 | Yano | G06F 12/0246 711/103 |
| 2011/0320884 | A1* | 12/2011 | Thilagar | G06F 11/0709 714/48 |
| 2013/0138903 | A1* | 5/2013 | Matsui | G06F 3/0605 711/162 |
| 2014/0208083 | A1* | 7/2014 | Burnett | G06F 9/38 712/228 |
| 2014/0215136 | A1* | 7/2014 | Gole | G06F 3/0616 711/103 |

(Continued)

*Primary Examiner* — Sean D Rossiter
*Assistant Examiner* — Stephanie Wu
(74) *Attorney, Agent, or Firm* — Fountainhead Law Group P.C.

(57) ABSTRACT

In some embodiments, a logging framework reserves space in an in-memory storage for a log entry upon receiving a first function call from an application being executed. Upon receiving a second function call from the application being executed, the framework writes the log entry in the space in the in-memory storage. Upon receiving a third function call from the application being executed, the framework selects a configuration for the application and comparing an indicator that is generated based on the executing of the application to the configuration. When the indicator meets a condition of the configuration, the framework copies the log entry from the space in the in-memory storage to a persistent storage space. The log entry is deleted from the space in the in-memory storage at a time after performing the comparing.

19 Claims, 10 Drawing Sheets

(56) References Cited

U.S. PATENT DOCUMENTS

| | | | |
|---|---|---|---|
| 2015/0026824 A1* | 1/2015 | Kim | H04W 4/029 726/28 |
| 2015/0199000 A1* | 7/2015 | Kawaura | G06F 1/3284 358/1.13 |
| 2015/0339229 A1* | 11/2015 | Zhang | G06F 9/50 711/130 |
| 2016/0162375 A1* | 6/2016 | Kim | G06F 11/3466 714/6.13 |
| 2017/0109258 A1* | 4/2017 | Martynov | G06F 11/3636 |
| 2017/0115937 A1* | 4/2017 | Kawabata | G06F 3/122 |

* cited by examiner

```
FUNCTION hello
{
    302 { // build metadata
          metadata.name = "hello log"
    304 { // start logging
          LOG_START(metadata)

306 { // perform actions
          // logic of actual function
          // ...
    308 { // log actions
          LOG_RUN(metadata, "hello running")
          // ...

310 { // calculate return code
          return_code = 0

312 { // end logging
          LOG_FINISHED(metadata,return_code)
}
```

```
FUNCTION hello
{
402 { LOG_START(name: exampleApp)

404 { LOG_RUN(name: exampleApp, Retrieving Input)

a = input(First Value?)
406 { LOG_RUN(name: exampleApp, "Input value 1 was entered - %s" %a)
    b = input(Second Value?)
408 { LOG_RUN(name: exampleApp, "Input value 2 was entered - %s" %b)

try:
        c = int(a)/int(b)
410 {   print c
        LOG_RUN(name: exampleApp, Result c = %f" %c)
        LOG_FINISHED(name: exampleApp, 0)

except:
        print "Could not calculate result – check log"
412 {   LOG_RUN(name: exampleApp, "Issue Occurred")
        LOG_FINISHED(name: exampleApp, 8)
}
```

```
                                                                    435
Log for exampleApp
     ⎧ 11:00:27 – Retrieving Input
     ⎪ 11:00:28 – Input value 1 was entered – 10
436 ⎨ 11:00:29 – Input value 2 was entered – 0
     ⎪ 11:00:29 – Issue occurred
     ⎩ 11:00:29 – Return code: 8  ← 438
```

FIG. 4E

SOFTWARE SYSTEM LOGGING BASED ON RUNTIME ANALYSIS

BACKGROUND

Software systems are very complex and to be able to manage a complex software system, the runtime behavior of the software system needs to be rigorously understood both when the software system is actually running and after it is finished running. To help with this understanding, logging and tracing may be implemented in the software system. The logging and tracing may trace the execution of the software system and log data regarding the execution.

The logging records information on what happened in the software system at a given time to a certain degree of detail. In some cases, the more an application logs, the better it is for a developer analyzing the execution of the software system. However, as a log requires memory (either of a transient or persistent nature), logging every possible decision, state, input, or output in the software system may use a large amount of memory.

BRIEF DESCRIPTION OF THE DRAWINGS

FIG. 3 depicts pseudo-code for performing the logging during runtime according to some embodiments.

4A depicts an example of an application according to some embodiments.

Figure 4B:
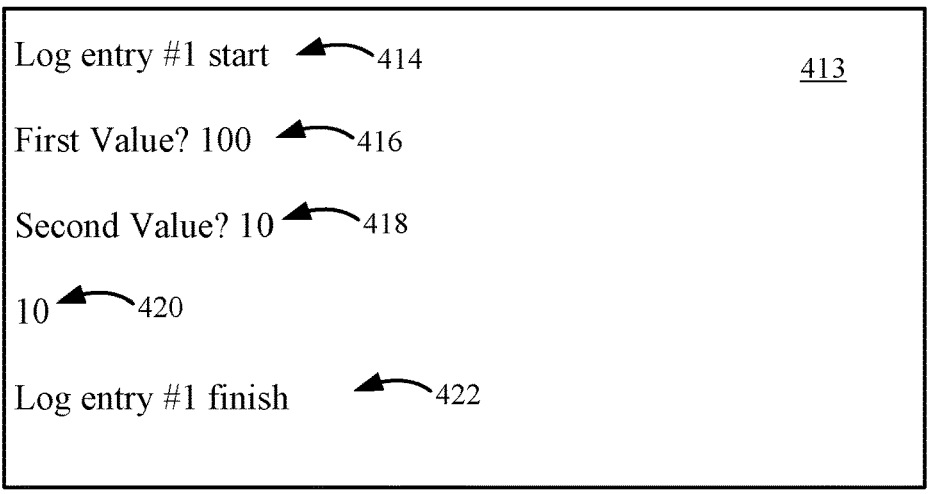

FIG. 4B shows an example of an error-free execution according to some embodiments.

Figure 4C:
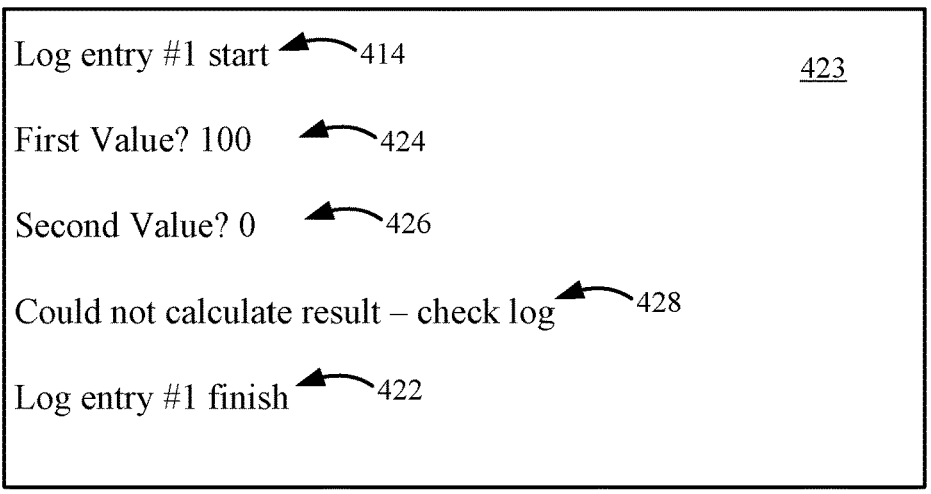

FIG. 4C shows an example of an execution with an error according to some embodiments.

Figure 4D:
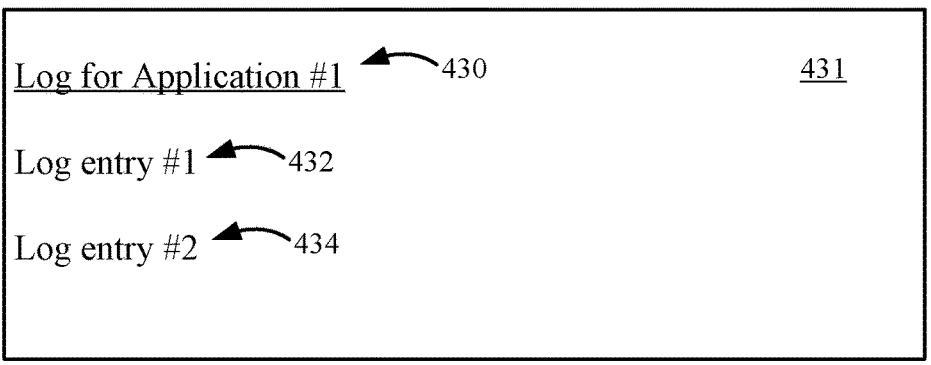

FIG. 4D shows persistent log files according to some embodiments.

FIG. 4E shows an example of a log file entry according to some embodiments.

Figure 5:
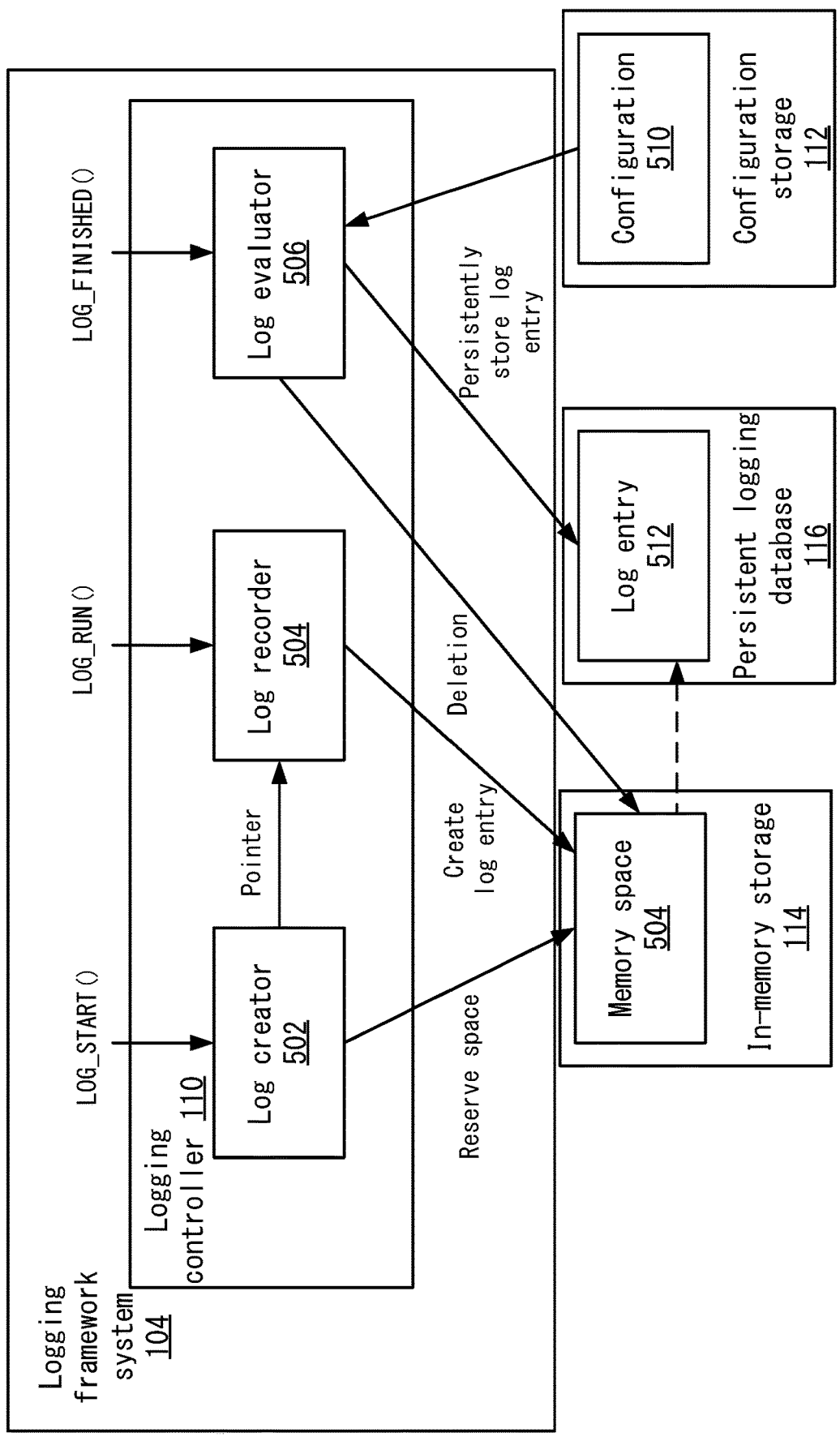

FIG. 5 depicts a more detailed example of a logging framework system according to some embodiments.

Figure 6:
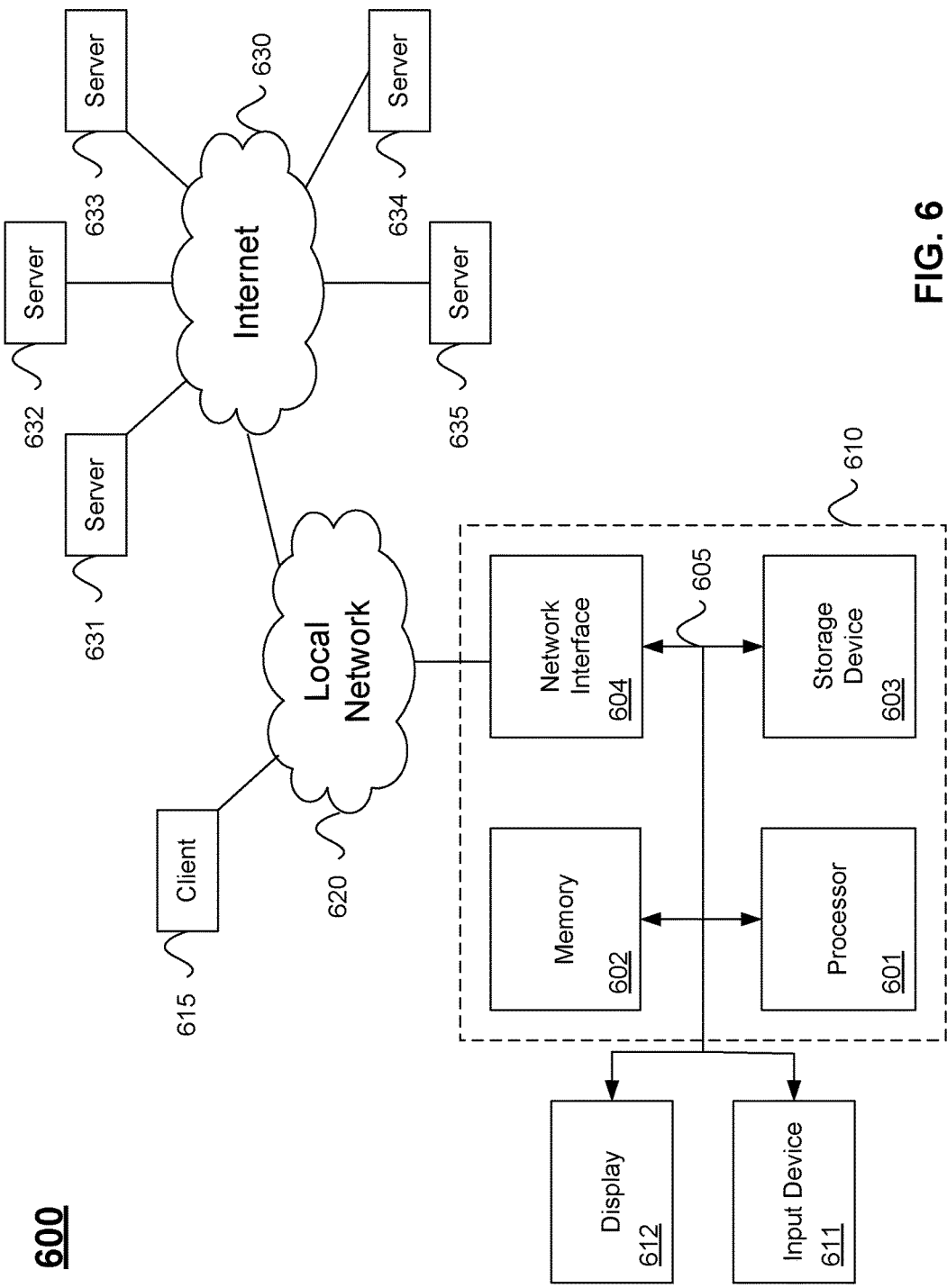

FIG. 6 illustrates hardware of a special purpose computing machine configured with a logging system framework system according to some embodiments.

DETAILED DESCRIPTION

Described herein are techniques for a logging system. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

A logging framework provides a logging mechanism that can decide what information to log during runtime of an application and log as much information that is configured. The logging framework includes an application programming interface (API) that exposes logging functions that a software system can execute during runtime of the application. The logging functions may cause the logging framework to reserve space for a log entry in in-memory space and write logs for software operations that occur while executing the software to the in-memory space. Then, another function is used to determine what information should be logged, if anything, based on a classification of a result of the software operations. For example, it is possible that nothing may be logged (e.g., when an acceptable result occurs); some information may be logged (e.g., when a warning occurs); and more information may be logged (e.g., when an error occurs). Also, some of the log information may be moved from in-memory space to persistent memory based on the classification of the result. Then, the logging information written to the in-memory space may be cleared. The above framework may save storage space by only logging what is needed and clearing the in-memory space. Further, since only important information is persisted, the resulting log files include only information that is highly relevant to a developer.

Overview

Figure 1:
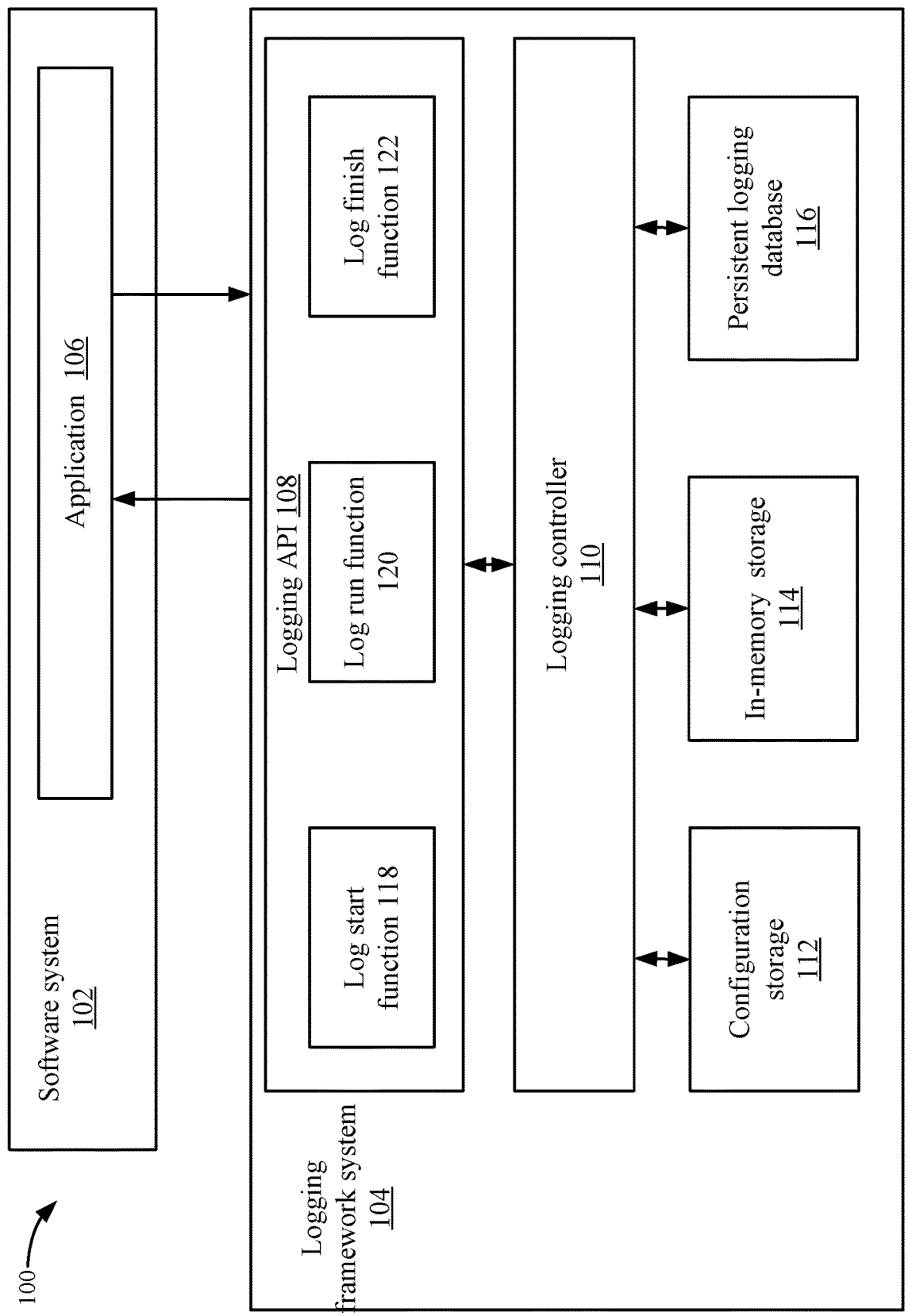
FIG. 1 depicts a simplified system of a method for performing logging according to some embodiments.

FIG. 1 depicts a simplified system 100 of a method for performing logging according to some embodiments. System 100 includes a software system 102 and a logging framework system 104. Software system 102 and logging framework system 104 may be executing on one or more computing devices, such as servers. Software system 102 and logging framework system 104 may be executing on the same computing device, different computing devices, or functions of each system may be distributed across multiple computing devices.

Software system 102 may be executing an application 106. The application may be a software program that includes software code that is executed by software system 102. In some embodiments, application 106 may include a business program that a business is using to model business processes. The business processes may be changed frequently and the operation of the application may need to be verified. This may cause a large amount of logs to be generated over time due to the verifying. Although business processes are discussed, software system 102 may be any system that is executing a software program.

Logging framework system 104 includes a logging API 108, a logging controller 110, configuration storage 112, in-memory storage 114, and a persistent logging database 116. Logging API 108 includes multiple functions that can be used to perform logging. For example, a log start (LOG_START) function 118, a log run (LOG_RUN) function 120, and a log finish (LOG_FINISH) function 122 are provided by logging API 108. Software system 102 may execute the functions to call the logging framework whenever logging may be needed in application 106, such as when a meaningful operation or action is being started, executed, and finished in application 106.

The log start function 118 may start a logging session and may include the structure of LOG_START (metadata). The metadata is a parameter that can be included with the log start function to pass information to logging system framework 104. For example, the metadata may identify the logging session. Application 106 may include multiple logging sessions that are started and finished. During the session, application 106 performs actions whose results may or may not be logged in a log entry, which may be one or more lines of information describing the run-time operation of application 106.

The log run function 120 logs information for a running session and may include the format of LOG_RUN (metadata, information). The metadata for the log run function 120 may be the same as the metadata for the log start, and may be used to identify the logging session. The information provided by the log run function describes an action performed by application 106 during the application's runtime execution for the log entry.

The log finish function 122 may finish logging and may include the format of LOG_FINISH (metadata, RETURN_CODE). The return code provided by "RETURN_CODE" may be determined by the execution of application 106. For example, the return code may be a code that is based on a result of the execution of the action. Although a code is discussed, other information that describes the execution of application 106 may be used, such as any value within a range.

Logging controller 110 receives the functions and parameters from logging API 108 and can communicate with configuration storage 112, in-memory storage 114, and persistent logging database 116 based on the functions received. In one example, software system 102 executes the functions when encountered in application 106. Software system 102 may determine information for the parameters of the functions and call logging API 108. Logging controller 110 may then perform an action with configuration storage 112, in-memory storage 114, and/or persistent logging database 116 based on the function and parameters that are received.

Configuration storage 112 may store a configuration for software system 102. The configuration may be used to determine whether or not to persistently store log content and/or whether to clear in-memory storage space. For example, application 106 may include conditions (e.g., rules) that are evaluated by logging controller 110 to determine an action to take, such as determining whether to persist the log entry. Each application 106 and/or software system 102 may have its own configuration to allow customization for logging. Also, the same configuration could be used across multiple applications and/or software systems.

In-memory storage 114 may be in-memory space, which may be non-persistent storage, such as random access memory (RAM) or local memory that may be cleared at some point during the operation of logging framework system 104. For example, in-memory storage 114 may be cleared in real-time, at a later configured time, or upon re-start of logging framework system 104.

Persistent logging database 116 may persistently store log content. For example, persistent logging database 116 may be a separate database from in-memory storage 114 and is not subject to any policies that remove the log content automatically. For example, log entries in persistent logging database 116 persist after logging framework system 104 is restarted and in-memory storage 114 is cleared.

A developer of software system 102 may not have to decide when to actually persist log content when using logging framework system 104. Rather, logging controller 110 may decide which content to log and persist. Instead, a developer may invoke the logging function when desired and logging framework system 104 may determine when to actually log content or not log content. For example, a return code in the log finish function 122 may be used as a technical indicator of the success of an operation of application 106. The configuration for each software system may define its own values with associated semantics such that the return code can be classified. Depending on the return code and the configuration, logging controller 110 can decide what to do for the logging during runtime based on the classification, such as determining whether to persist a log entry or delete the log entry. For example, the classification may indicate whether the operation was a success, failure, or other classification.

Runtime

Figure 2A:
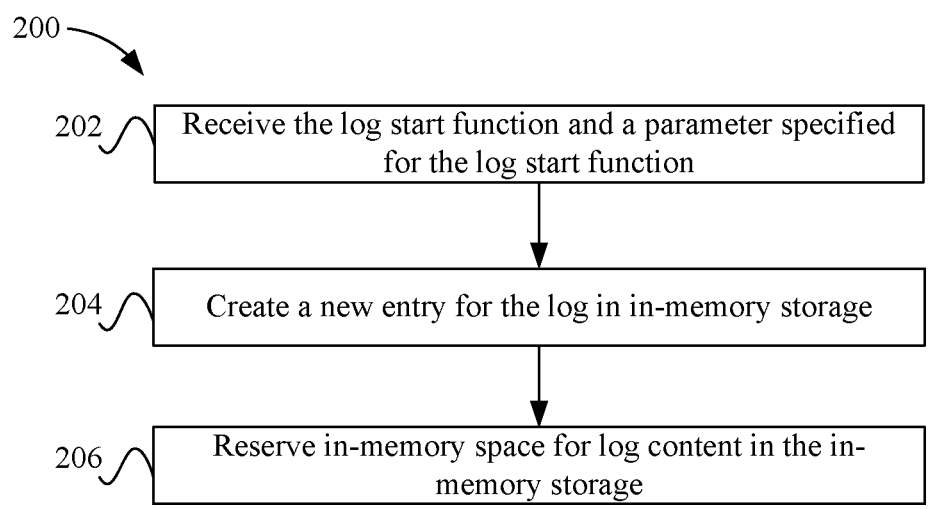
FIG. 2A depicts a simplified flowchart for executing a log start function according to some embodiments.
Figure 2B:
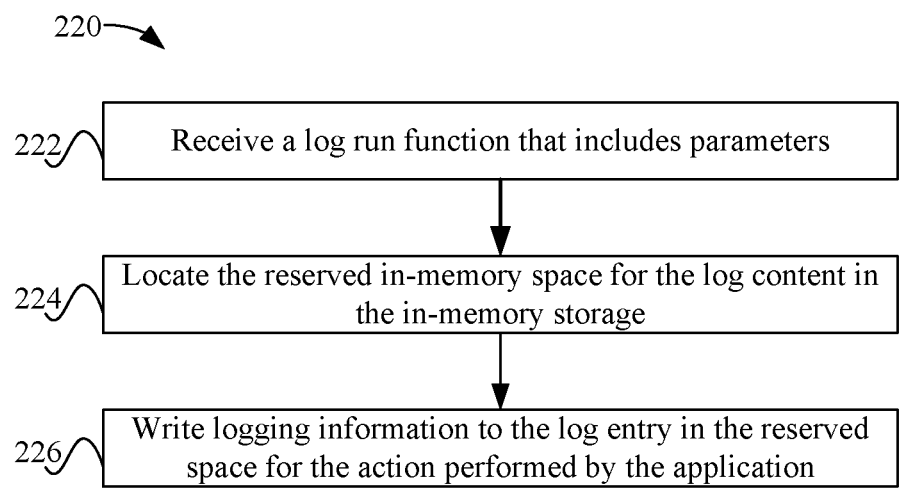
FIG. 2B depicts a simplified flowchart for processing a log run function according to some embodiments.
Figure 2C:
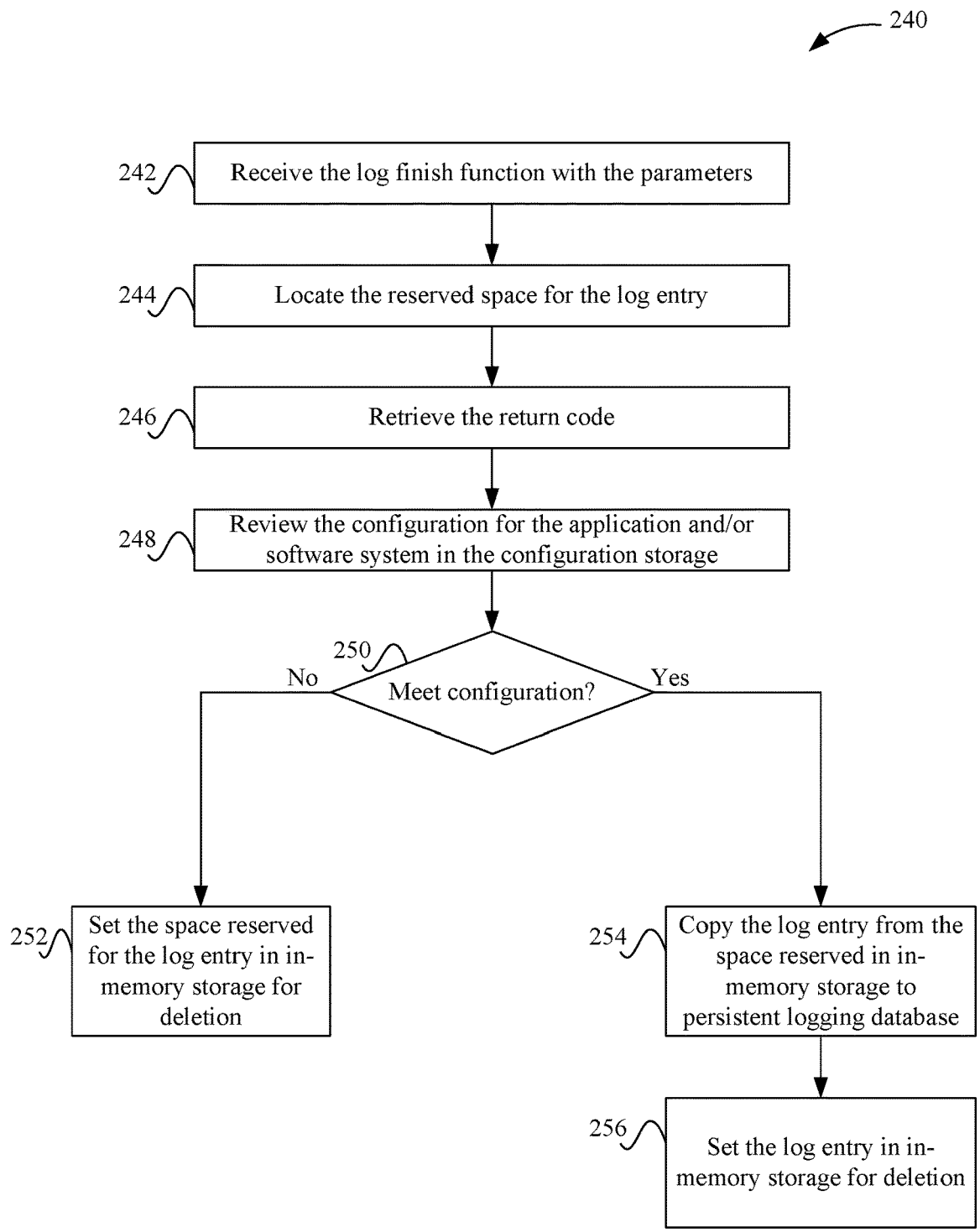
FIG. 2C depicts a simplified flowchart of a method for processing a log finish function according to some embodiments.

During runtime, software system 102 executes the software code of application 106 and can invoke logging framework system 104 dynamically in real-time during the execution. FIGS. 2A-2C depict simplified flowcharts for executing the log start, log run, and log finish functions according to some embodiments. FIG. 2A depicts a simplified flowchart 200 for executing the log start function 118 according to some embodiments. At 202, logging API 108 receives the log start function 118 and a parameter specified for the log start function 118. For example, application 106 executes a line of software code that includes the log start function 118. Then, application 106 determines the metadata that identifies the logging session and invokes the log start function with the metadata.

At 204, logging controller 110 creates a new entry for the log in in-memory storage 114. The new entry may be for this logging session and includes a unique identifier for the log entry based on the metadata included with the log start function 118.

At 206, logging controller 110 reserves in-memory space for log content in in-memory storage 114. The space reserved may be a specific amount of space or may be a variable amount of space within in-memory storage 114. The space that is reserved may be marked via a pointer to the location in in-memory storage 114, which may be any information that can be used to identify the reserved space. For the specific amount of space, a beginning pointer and end pointer may be determined. For the variable amount of space, the pointer may point to a beginning point and then a variable amount of information for the log may be inserted after the beginning point.

Once the log start function 118 is received, application 106 may continue to execute. For example, application 106 may perform actions while executing software code. FIG. 2B depicts a simplified flowchart 220 for processing a log run function 120 according to some embodiments. At 222, logging API 108 receives a log run function 120 that includes parameters. For example, application 106 executes a line of software code that includes the log run function 120. Then, application 106 determines the metadata that identifies the logging session and determines information for actions that were performed by application 106. The information may be text, a value from a variable, or other information generated from the execution of one or more lines of software code in application 106. Then, application 106 invokes the log run function.

At 224, logging controller 110 locates the reserved in-memory space for the log content in in-memory storage 114. For example, logging controller 110 may use the pointer to the in-memory space to locate where to write to the log entry. At 226, logging controller 110 may then write logging information to the log entry in the reserved space for the action performed by application 106. For example, the information specified as a parameter in the log run function 120 may be written to the reserved space. It is noted that multiple log run functions 120 may be executed in a logging session. That is, in between the log start function 118 and log finish function 122, multiple log run functions 120 may be executed to insert information into the log entry.

At some point, the end of the logging session may be reached. FIG. 2C depicts a simplified flowchart 240 of a method for processing a log finish function 122 according to some embodiments. At 242, logging controller 110 may receive the log finish function 122 with the parameters. For example, application 106 executes a line of software code that includes the log finish function 122. Application 106 may determine the applicable parameters, such as metadata and a return code from the execution of application 106. The metadata may be the same metadata as provided in the log start and log run functions to identify the logging session. The return code may be based on a result of an action taken during the execution of application 106 and may be a technical indicator of the success of the action. In some embodiments, the return code may be an integer-based code that has four possible values, but it will be understood that other return codes may be used and are not limited to four value codes. An example of a four possible values may be the 0, 2, 4, or 8 values. The "0" value is when an operation is considered successful and included no issues. A "2" value is a warning where the operation was successful, but there may have been some reservations about the operation. A "4" value is when an error occurred where the operation was not successful. An "8" value is a severe error where the operation was severely non-successful, such as resulting in a crash of application 106. In some embodiments, application 106 may determine the return code based on different conditions that occur during execution or by comparing a result of an action to different thresholds.

At 244, logging controller 110 locates the reserved space for the log entry. For example, logging controller 110 uses the pointer to determine the reserved space in in-memory storage 114.

At 246, logging controller 110 retrieves the return code. For example, logging controller 110 checks the value of the return code in the log finish function 122.

At 248, logging controller 110 may review the configuration for application 106 and/or software system 102 in configuration storage 112. For example, the configuration may indicate the semantics (e.g., rules) to use to check the return code. In one example, the semantics describe what evaluation is used to check the return code, such as a comparison of the return code to a threshold, such as a configured minimum that may be a value that is set in the configuration.

At 250, logging controller 110 evaluates the return code versus the threshold, such as comparing the return code to the configured minimum to determine whether the return code meets (e.g., is greater than, greater than or equal to, less than, etc.) the configured minimum. For example, the higher the value of the return code, the higher the severity of the error that may have been encountered. For example, a value of 8 indicates that a more severe error occurred compared with a value of 2. Then, if the configured minimum is "2", a return code of 8 meets the threshold.

If the return code does not meet the configuration (e.g., is less than the configured minimum), at 252, logging controller 110 then sets the space reserved for the log entry in in-memory storage 114 for deletion. In this case, the configuration indicates that the log is not considered important (e.g., no error was encountered and the action was a success) and information for the log entry does not need to be logged. For example, if the configured minimum is the number "2", and a return code is 0 or 2, then the operation performed by application 106 did not incur an error or a serious enough error to log information. In this case, the space reserved for the log entry in in-memory storage 114 is deleted either at this time or at a later time. Further, no information regarding the log entry may be stored in persistent logging database 116. Although deleting the log entry is described here, it will be understood that the log entry may be deleted at different points from in-memory storage 114. For example, the log entry may be deleted at the end of the execution of application 106 or at the re-start of logging framework system 104. However, at some point, the space reserved in in-memory storage 114 for the log entry would be deleted with the log entry is not persisted.

If the return code meets the configuration (e.g., is greater than the configured minimum), then at 254, logging controller 110 copies the log entry from the space reserved in in-memory storage 114 to persistent logging database 116. This persistently stores the log entry from in-memory storage 114. For example, if a return code of 4 or 8 was received and the configured minimum is 2, then logging controller 110 considers the result of the action to be severe enough that the log entry should be persistently stored. This log entry can then be reviewed later by a developer. Then, at 256, logging controller 110 sets the log entry in in-memory storage 114 for deletion.

EXAMPLES

FIG. 3 depicts pseudo-code for performing the logging during runtime according to some embodiments. An application 106 may include a function of "hello". At 302, the metadata may be generated for the logging functions. For example, the metadata may be "hello log", which identifies the logging session.

At 304, a logging session is started by executing the log start function 118 and including the metadata as the parameter. In this case, the metadata that is included is "hello log". At 306, application 106 may perform actions using logic of the actual function hello in application 106. Then, at 308, one or more actions may be logged using the log run function 120. For example, the function "LOG_RUN (metadata, "hello running")" may be executed. This logs an action that corresponds to "hello running" for the logging session.

At 310, a return code is calculated. In this case, "RETURN_CODE" is set to 0. Application 106 may determine the value of 0 based on the result of performing the actions in application 106.

At 312, the logging session is ended by executing a log finish function 122 of "LOG_FINISH (metadata, RETURN_CODE)". This provides the return code of 0 to logging controller 110 for the logging session. Logging controller 110 then uses the return code to determine how to log the log entry.

FIGS. 4A-4E show a specific example according to some embodiments. The example in FIG. 4A-4E is just one example that divides two integers received from user input. If the user enters correct values (e.g., non-zero values), the result is presented by application 106, and no log entry is written (see FIG. 4B). However, if an error occurs (see FIG. 4C), logging controller 110 generates a log file (see FIG. 4D). Logging controller 110 may also display the log (see FIG. 4E).

FIG. 4A depicts an example of application 106 according to some embodiments. At 402, a log start function 118 is shown. The metadata shows that the "name" of the logging session for the application is "exampleApp".

At 404, a log run function 120 is executed and includes the parameters of the same metadata of "exampleApp" with the information of "Retrieving input". The information of "Retrieving input" is input into the log entry.

At 406, a first action is taken of setting the variable "a" to the input value of input ("First Value?"). The variable "a" is set to the first value that is input by a user. Then, a log run function 120 is executed that provides the input value to logging controller 110. The phrase "'Input value 1 was entered—% s' % a" writes the value that was input to the log entry. Similarly, at 408, a second value is input for a variable "b". A second log run function 120 is executed to provide the second input value that is entered by the user to logging controller 110, which inputs the second value into the log entry.

Application 106 may then, at 410, attempt to execute a block of software code. For example, application 106 attempts to calculate a value of the variable "c" as a division of integers of int(a)/int(b), where "int" is an integer of the value a or b. This will be valid unless the value of the second input (b) is 0. Then, the value for the variable c is printed (e.g., output) by application 106. A log run function 120 is executed that provides the result of variable c to logging controller 110. Logging controller 110 writes the value of the variable c to the log entry. Then, a log finish function 122 is executed and provides a return code of "0". The return code of "0" may be returned because the operation was a success for calculating variable "c" and no error occurred.

At 412, if the integer division above was not successful for the variable c, then the software code block shown at 412 is executed instead of the code block shown at 410. For example, a print command is executed to print the phrase "Could not calculate result—please check log." Then, a log run function 120 is executed that provides the information of "issue occurred". Logging controller 110 writes the phrase to the log entry. Then, a log finish function 122 is executed that provides a return code of "8". The return code of "8" is returned because an error was encountered.

FIG. 4B shows an example of an error-free execution at 413 according to some embodiments. This occurs when the code block at 410 is executed by application 106. At 414, an entry identifying the start of the log entry in logging session is shown. Then, at 416 and 418, the first value ("100") and the second value ("10") that are input are shown in the log entry from the log run values shown in blocks 406 and 408, respectively. At 420, the value of "10" from variable "c" is shown from the log run function shown in block 410. At 422, the log entry and logging session is finished.

Logging controller 110 may delete the log entry shown at FIG. 4B from in-memory storage 114. For example, if the configuration indicates that if the return code is above a configured minimum, such as 0, then the log entry is persisted. If not, the log entry is not persisted. In this case, the return code is "0" and the log entry is not persisted and deleted from in-memory storage 114.

FIG. 4C shows an example of an execution with an error at 423 according to some embodiments. At 414, the same log entry identification of the logging session is shown. At 424 and 426, the first input ("100") and the second input ("0"), respectively, are shown. At 426, the second value for the second input is "0", which causes an error. Accordingly, at 428, the log entry indicates that the result could not be calculated for variable "c" as was indicated by the print statement in block 412. Then, at 422, the log entry and logging session ends. In this case, the return code is "8" and according to the configuration, logging controller 110 persists this log entry because the return code is greater than the configured minimum of "0". For example, logging controller 110 may copy this log entry from in-memory storage 114 to persistent logging database 116 and then delete this log entry from in-memory storage 114.

FIG. 4D shows persistent log files 431 according to some embodiments. At 430, the application is identified as "Application #1". Then, at 432 and 434, identifiers for log entries are respectively shown. In some embodiments, only identifiers for log entries that were persisted in persistent logging database 116 are identified here. In this case, the log entry shown in FIG. 4B will not be identified in these log files. In another embodiment, an identifier for a log entry that was not persisted may be shown, but no information may be stored for the log entry.

When links for log entries that were persisted are selected, logging controller 110 can display a corresponding log entry from persistent logging database 116. FIG. 4E shows an example of a log file entry 435 according to some embodiments. At 436, the information that was entered using the log run functions is shown. Also, at 438, the return code is shown of "8". The log entry summarizes the inputs and indicates an issue occurred.

System Example

FIG. 5 depicts a more detailed example of logging framework system 104 according to some embodiments. A log creator 502 in logging controller 110 receives a log start function 118 from API 108 and then reserves space in in-memory storage 114 for a log entry. Log creator 502 may determine a pointer to the space in in-memory storage 114 that is reserved at 504.

A log recorder 506 may then receive a log run function 120 and can then use the pointer to determine the space reserved in in-memory storage 114 at 504. Log recorder 506 may then write log information into the space 504. Any number of log run functions 120 may be received.

A log finish function 122 may then be received at a log evaluator 508 to finish the session. Log finish function 122 also includes a return code that is provided to a log evaluator 508. Log evaluator 508 can then evaluate the code using a configuration 510 from configuration storage 112. As discussed above, configuration 510 includes semantics that can be used to evaluate the return code. Upon evaluation, log evaluator 508 may copy a log entry at 504 into persistent logging database 116 if applicable (e.g., an issue was encountered). In some cases, however, log evaluator 508 may not persistently store the log entry. Additionally, log evaluator 508 may mark the log entry in the reserved space 504 in in-memory storage 114 for deletion.

CONCLUSION

Some embodiments provide many technical advantages. For example, minimal storage space may be used because not every log entry is persistently logged. Rather, relevant logs are persisted based on the configuration and runtime values that are determined. This saves memory and also the total cost of ownership of system software 102 is reduced due to the reduced storage space needed. Further, the ease of implementation of logging is reduced because fewer decisions are required for a developer because the functions just need to be invoked and logging controller 110 can determine whether or not the log entries are logged and/or persisted based on the runtime operation of application 106. The logs that are persistently stored may be more meaningful because only information that logging controller 110 considers important are persisted. The depth and density of logs is higher as relevant log content is not persisted.

The use of the logging functions also provides flexibility. For example, the rules in the configuration can be maintained differently for different applications, but also differently for the same application for a different context, such as testing production systems. Only the configuration needs to be changed to change the rules and not the logging functions.

System

FIG. 6 illustrates hardware of a special purpose computing machine configured with logging system framework system 104 according to some embodiments. An example computer system 610 is illustrated in FIG. 6. Computer system 610 includes a bus 605 or other communication mechanism for communicating information, and a processor 601 coupled with bus 605 for processing information. Computer system 610 also includes a memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of computer readable storage mediums.

Computer system 610 may be coupled via bus 605 to a display 612, such as a liquid crystal display (LCD), for displaying information to a computer user. An input device 611 such as a keyboard and/or mouse is coupled to bus 605 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 610 can send and receive information through the network interface 604 across a local network 620, an Intranet, or the Internet 630. In the Internet example, software components or services may reside on multiple different computer systems 610 or servers 631-635 across the network. The processes described above may be implemented on one or more servers, for example. A server 631 may transmit actions or messages from one component, through Internet 630, local network 620, and network interface 604 to a component on computer system 610. The software components and processes described above may be implemented on any computer system and send and/or receive information across a network, for example.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method comprising:

upon receiving, by a computing device, a first function call for starting a logging session from an application being executed, starting the logging session for a log entry and reserving space in an in-memory non-persistent storage for the log entry, wherein the first function call includes a metadata parameter that identifies the logging session;

upon receiving, by the computing device, a second function call for writing to a log entry from the application being executed, writing information to the log entry in the space in the in-memory non-persistent storage during the logging session;

upon receiving, by the computing device, a third function call to end the logging session from the application being executed, the third function call including an indicator parameter that is generated based on the executing of the application:

ending the logging session for the log entry, obtaining a stored configuration for the application from a configuration storage including different configurations for a plurality of different applications or contexts, the stored configuration defining conditions for classifying log entries of the application, and comparing the indicator that is generated based on the executing of the application to a condition of the configuration, wherein the first function call, the second function call, and the third function call are included in software code of the application being executed and are executed by the application during runtime of the application to selectively start and end the logging session for the log entry;

when the indicator meets the condition of the configuration:

copying, by the computing device, the log entry from the space in the in-memory non-persistent storage to a persistent storage space; and deleting, by the computing device, the log entry from the space in the in-memory non-persistent storage at a time after performing the comparing.

2. The method of claim 1, when the indicator does not meet the condition of the configuration, not copying the log entry from the space in the in-memory non-persistent storage to the persistent storage space.

3. The method of claim 1, further comprising:
marking the log entry for deletion after performing the copying or when the indicator does not meet the condition of the configuration.

4. The method of claim 1, further comprising:
upon receiving the third function call from the application being executed, retrieving the configuration and determining the condition from the configuration.

5. The method of claim 1, wherein the indicator comprises a return code.

6. The method of claim 1, wherein the indicator quantifies a success of an operation performed by the application.

7. The method of claim 1, wherein the first function call starts the logging session.

8. The method of claim 1, wherein the second function call generates the log entry in the logging session.

9. The method of claim 1, wherein the second function call includes a metadata parameter that identifies the logging session and an information parameter that includes information that is used to generate the log entry, the information describing an action performed by the application.

10. The method of claim 1, wherein the condition comprises a rule that is evaluated based on the indicator.

11. The method of claim 1, wherein the third function call includes a metadata parameter that identifies the logging session.

12. A non-transitory computer-readable storage medium containing instructions, that when executed, control a computer system to be configured for:
upon receiving a first function call for starting a logging session from an application being executed, starting the logging session for a log entry and reserving space in an in-memory non-persistent storage for the log entry, wherein the first function call includes a metadata parameter that identifies the logging session;
upon receiving a second function call for writing to a log entry from the application being executed, writing information to the log entry in the space in the in-memory non-persistent storage during the logging session;
upon receiving a third function call to end the logging session from the application being executed, the third function call including an indicator that is generated based on the executing of the application:
ending the logging session for the log entry,
obtaining a stored configuration for the application from a configuration storage including different configurations for a plurality of different applications or contexts, the stored configuration defining conditions for classifying log entries of the application, and
comparing the indicator that is generated based on the executing of the application to a condition of the configuration, wherein the first function call, the second function call, and the third function call are included in software code of the application being executed and are executed by the application during runtime of the application to selectively start and end the logging session for the log entry;
when the indicator meets the condition of the configuration:
copying the log entry from the space in the in-memory non-persistent storage to a persistent storage space; and
deleting the log entry from the space in the in-memory non-persistent storage at a time after performing the comparing.

13. The non-transitory computer-readable storage medium of claim 12, when the indicator does not meet the condition of the configuration, not copying the log entry from the space in the in-memory non-persistent storage to the persistent storage space.

14. The non-transitory computer-readable storage medium of claim 12, further configured for:
marking the log entry for deleting after performing the copying or when the indicator does not meet the condition of the configuration.

15. The non-transitory computer-readable storage medium of claim 12, further configured for:
upon receiving the third function call from the application being executed, retrieving the configuration and determining the condition from the configuration.

16. The non-transitory computer-readable storage medium of claim 12, wherein the indicator comprises a return code.

17. The non-transitory computer-readable storage medium of claim 12, wherein the indicator quantifies a success of an operation performed by the application.

18. The non-transitory computer-readable storage medium of claim 12,
wherein the second function call includes the metadata parameter that identifies the logging session and an information parameter that includes information that is used to generate the log entry, the information describing an action performed by the application, and
wherein the third function call includes the metadata parameter that identifies the logging session.

19. An apparatus comprising:
an in-memory non-persistent storage;
one or more computer processors; and
a non-transitory computer-readable storage medium comprising instructions, that when executed, control the one or more computer processors to be configured for:
upon receiving a first function call for starting a logging session from an application being executed, starting the logging session for a log entry and reserving space in the in-memory non-persistent storage for the log entry, wherein the first function call includes a metadata parameter that identifies the logging session;
upon receiving a second function call for writing to a log entry from the application being executed, writing information to the log entry in the space in the in-memory non-persistent storage during the logging session;
upon receiving a third function call to end the logging session from the application being executed, the third function call including an indicator that is generated based on the executing of the application:
ending the logging session for the log entry,
obtaining a stored configuration for the application from a configuration storage including different configurations for a plurality of different applications or contexts, the stored configuration defining conditions for classifying log entries of the application, and
comparing an indicator that is generated based on the executing of the application to a condition of the configuration, wherein the first function call, the second function call, and the third function call are included in software code of the application being executed and are executed by the application during runtime of the application to selectively start and end the logging session for the log entry;

when the indicator meets the condition of the configuration:

copying the log entry from the space in the in-memory non-persistent storage to a persistent storage space; and deleting the log entry from the space in the in-memory non-persistent storage at a time after performing the comparing.

* * * * *